No. 805,053. PATENTED NOV. 21, 1905.
I. W. COLBURN.
GLASS DRAWING APPARATUS AND PROCESS.
APPLICATION FILED SEPT. 19, 1903.

No. 805,053. PATENTED NOV. 21, 1905.
I. W. COLBURN.
GLASS DRAWING APPARATUS AND PROCESS.
APPLICATION FILED SEPT. 19, 1903.

WITNESSES
Gustave R. Thompson
Wm B. Kirkam

INVENTOR
Irving W. Colburn
by Munro Cameron Lewis
ATTORNEYS

UNITED STATES PATENT OFFICE.

IRVING W. COLBURN, OF FRANKLIN, PENNSYLVANIA.

GLASS-DRAWING APPARATUS AND PROCESS.

No. 805,053.      Specification of Letters Patent.      Patented Nov. 21, 1905.

Application filed September 19, 1903. Serial No. 173,865.

*To all whom it may concern:*

Be it known that I, IRVING W. COLBURN, of Franklin, Pennsylvania, have invented a new and useful Glass-Drawing Apparatus and Process, which invention is fully set forth in the following specification.

This invention relates to the art of glass-working, and more particularly to the art of drawing glass from receptacles or pots containing a supply of molten glass.

The particular exemplification of the invention hereinafter illustrated and described has reference to the drawing of cylinders of glass, which cylinders may be utilized in cylindrical form as drawn or may be split open and flattened out to form sheets of glass in ways well known in the art; but it is to be particularly understood that many features of the invention are not limited to drawing cylinders, since they are equally applicable to the drawing of glass in sheets or other forms.

It has heretofore been proposed to draw cylinders of glass by dipping a cylindrical bait or mold into a bath of molten glass and then steadily elevating the bait and at the same time permitting air to enter the cylinder either under atmospheric or higher pressure, while the exterior of the cylinder at a point adjacent to the surface of the bath of molten glass is cooled by suitable means.

The present invention consists in improvements upon the method just described and the apparatus employed for carrying such method into effect.

Broadly stated, the improvements consist—

First. In providing means for controlling and thereby regulating the flow and the level or height of the molten glass in the receiving chamber or pot to the end that the glass as it is being drawn will always be taken from the same point or level and maintained by suitable heating or cooling means in the desired condition for most effective drawing. In the form of the invention herein shown this is accomplished by providing a melting and refining chamber in which the glass is melted and refined, a receiving chamber or pot from which the glass is drawn, and an intermediate delivery or pressure chamber receiving the glass from the melting and refining chamber and delivering it to the receiving chamber or pot, in combination with a displacement device for controlling the flow and level or height of the molten glass in the receiving chamber or pot and certain heating and cooling devices whereby the glass is maintained in the desired condition for most effective working. Prior to the present invention the surface of the bath of molten glass has gradually lowered as the glass in forming the cylinder was drawn therefrom, so that the point where the glass emerged from the bath as it was drawn into cylindrical form has steadily lowered as the drawing of the cylinder progressed. This has several important disadvantages. In order that the cylinder may be successfully drawn and in order to control the thickness of the walls thereof, it is essential that the glass forming the cylinder should be lowered in temperature immediately after emerging from the surface of the bath of molten glass, and apparatus is usually provided for this purpose located at a proper distance above the surface of the bath, and when this surface is constantly changing or being lowered in the process of forming the cylinder it will be readily understood that the thickness of the glass forming the walls of the cylinder would be gradually decreased, because the cooling-point would be gradually removed from the surface of the bath. By providing means for controlling the flow of the molten glass, whereby it is possible to maintain the surface thereof approximately constant, it is rendered possible to have the cooling agency act upon the surface of the cylinder always at a predetermined distance from the surface of the bath, and thereby secure greater uniformity in the thickness of the walls of the cylinder.

Second. The invention consists in causing the glass to overflow around the margin or lip of the receiving chamber or pot and drawing the cylinder of glass from said overflow lip or margin instead of direct from the mass of molten glass in the receptacle, as has heretofore been the practice. In the art as heretofore practiced the diameter of the cylinder and the thickness of the glass have been limited, whereas by drawing the glass from the overflow margin or lip of the receiving-chamber the cylinder may be of any desired diameter, and the glass walls thereof may be made of any desired thickness within reasonable limits.

Third. In the art as heretofore practiced the cylinder of glass as it was drawn has been cooled upon the exterior surface by suitable means, the object of this being to cause the mass of molten glass constituting the walls of the cylinder to set or harden to such degree that they would not be drawn too thin in the act of forming the lower portions of the cylinder. The difficulty has been, however, that cooling upon the exterior surface of the cylinder alone was not sufficient, since the hot glass within the cylinder parted with its heat to the exterior portion of the cylinder and was liable to leave it in a condition where it would be drawn thinner than was desired. Efforts have been made to provide, in addition to exterior cooling means, means for cooling the cylinder upon the interior; but such means have not proved effective for accomplishing the desired result. By the present invention efficient means are provided for cooling the interior surface of the cylinder at a point adjacent to and at a predetermined distance above the surface of the bath of molten glass, and the cylinder of glass being steadily cooled both upon the exterior and upon the interior at a point but slightly removed from the surface of the molten glass a cylinder of uniform thickness is readily secured, the wall of the cylinder being readily hardened to a degree sufficient to enable it to maintain its thickness during the operation of drawing the remaining portion of the cylinder.

The invention further consists in certain details of construction and modes of operation, which will be hereinafter described and then specifically pointed out in the claims.

The inventive idea involved may be embodied in a great variety of mechanical forms, one mechanical expression of this inventive idea being embodied in the construction shown in the accompanying drawings, in which—

Referring to the drawings, which form a part of this specification, and in which like numerals refer to like parts, 1 indicates the melting and refining chamber of the apparatus, in which the glass is melted and refined preparatory to being drawn.

2 is the pressure or delivery chamber, communicating with the chamber 1 through conduit 3, which conduit can be opened or closed by means of a displacement-piece 4.

Figures 1, 2:
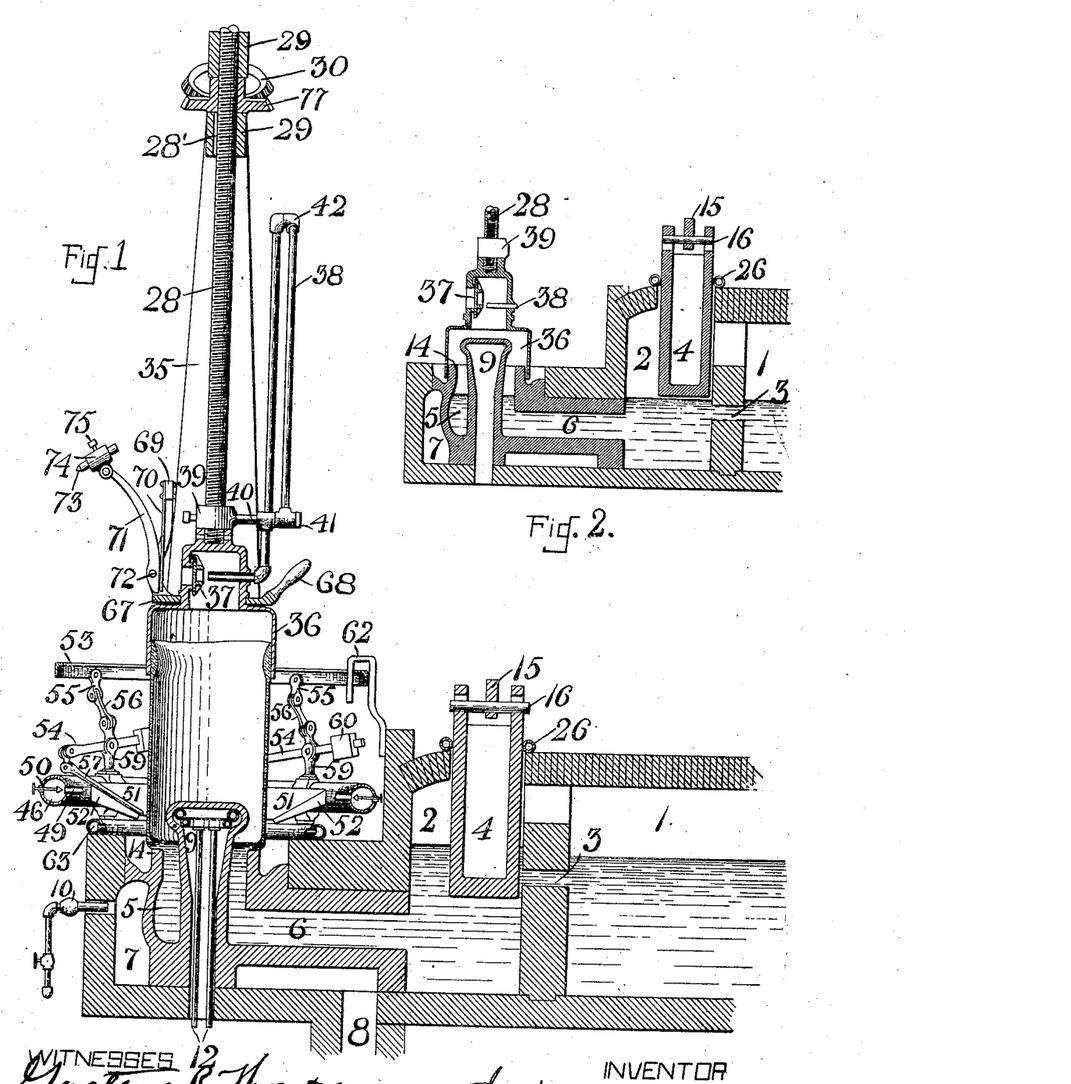
Figure 1 is a vertical central section of the apparatus.
Fig. 2 is a like section of a detailed portion, showing the parts in a different position from that shown in Fig. 1.
Figure 7:
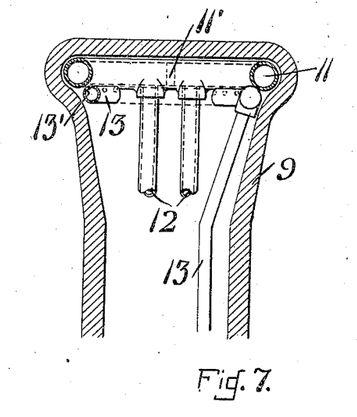
Fig. 7 is an enlarged broken central section of the filling-block shown in Fig. 1.

5 is the receiving chamber or pot, communicating with the pressure or delivery chamber 2 through conduit 6, said receiving chamber or pot having its temperature controlled by the heat in the reheating-chamber 7, substantially surrounding the receiving chamber or pot 5 and being provided with gas-burning jets 10 and an offtake-flue 8, (shown in Fig. 1,) through which the waste heat and gases pass to the stack-flue. The receiving chamber or pot 5 is provided with a hollow filling-block 9, preferably located centrally therein and passing out of the top of the receiving chamber or pot, and thereby reducing the area of the top of the receiving chamber or pot, thus allowing but a small portion of the top surface of the molten glass in the receiving chamber or pot to be exposed, which reduces the radiation of heat from that portion of the molten glass from which the cylinder is drawn and prevents an excess of heat in the interior of the cylinder. The office of this block is twofold. That portion of the filling-block which is below the surface of the molten glass within the chamber acts by displacement to materially reduce the amount of molten glass required to fill the chamber, and by giving a proper form to the upper portion of the filling-block above the surface of the molten glass—viz., by expanding or enlarging the same—it acts to protect the interior of the cylinder (as the same is being drawn) from the heat which would otherwise be radiated from the surface of the hot glass within the receiving chamber or pot 5. This filling-block, and particularly the upper portion of it, may be of various forms without departing at all from the spirit of the invention. As shown in Fig. 1, it consists of a hollow tube rising from the bottom of the receiving chamber or pot and flared outwardly above the surface of the molten glass within the pot 5. Within the hollow head of the filling-block is located means for keeping the block cool, which consists of an annular pipe 11, provided with inlet and outlet pipes 12 for conveying water or other cooling medium into and away from the pipe 11, said last-mentioned pipe being provided with a partition 11', (shown in dotted lines in Fig. 7,) so that the cooling medium is compelled to enter by one of the pipes 12 and leave by the other. In addition to the annular pipe 11 and the pipes 12 12 there may be and preferably is a cooling device in the form of a pipe 13, provided with outlets 13' for directing streams of air against the under side of the pipe 11 and circulating between said pipe and the walls of the filling-block. The cooling means thus described will keep the top portion of the filling-block 9 cooled, and this by radiation will chill the inner surface of the glass cylinder as this is in the act of being drawn.

Figure 8:
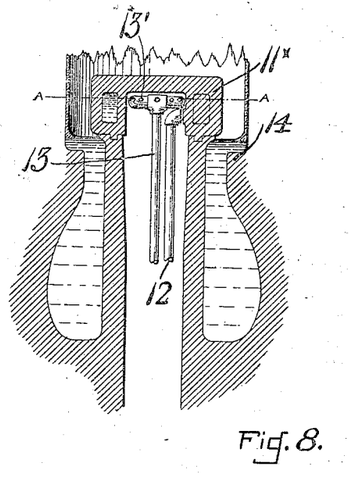
Fig. 8 is a like section of another form of filling-block, together with the receiving chamber or pot with a broken fragment of the cylinder as the same is being drawn therefrom.
Figure 9:
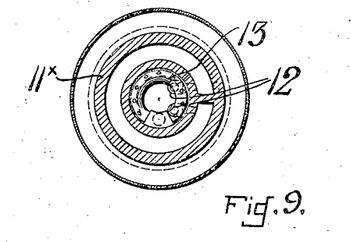
Fig. 9 is a horizontal section of Fig. 8 on the line A A.
Figure 10:
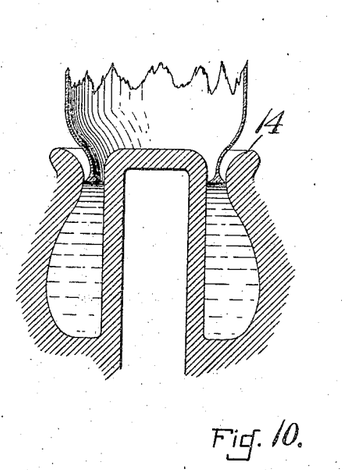
Fig. 10 is a central vertical section of the receiving chamber or pot, together with its filling-block, showing a cylinder in the act of being drawn from the surface of the bath of molten glass rather than from the overflow-lip.
Figure 11:
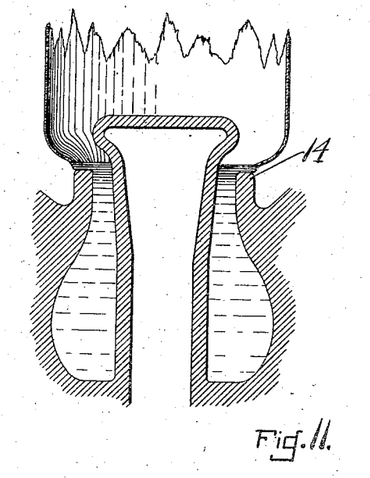
Fig. 11 is a central vertical section of a receiving chamber or pot with a filling-block therefor without any cooling apparatus.
Figure 12:
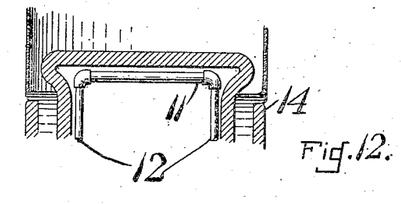
Fig. 12 is a vertical section of a detail, showing a filling-block of an elongated oval section.
Figure 13:
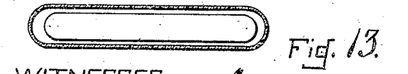
Fig. 13 is a plan view of a filling-block such as shown in Fig. 12, together with a section of the glass being drawn in connection therewith.

In Fig. 8 is shown a modification of the filling-block. The block proper is hollow and opened at the top, upon which is fitted a water-cooled ring 11<sup>x</sup>, which is provided with suitable inlet and outlet pipes 12 12, by which a constant circulation of water can be maintained. 13 is an air-pipe which has holes or outlets directing a stream of air against the inside of the water-cooled ring, thereby assisting the circulating water to keep the ring cool. Figs. 10 and 11 show a hollow filling-block having the top closed and the bottom open, depending on the atmospheric air to keep the top cool. Still another form of filler-block is shown in Figs. 12 and 13, in which the block has elongated parallel sides connected with oval end portions and the cooling-pipe 11 and inlet and outlet pipes 12 12. This form of block enables flattened cylinders to be drawn.

Receiving pot or chamber 5 is provided with an upper margin or edge 14, which will be herein designated the "overflow-lip." This overflow-lip may be of any desired form in cross-section. As shown in Figs. 1, 3, 4, 6, 8, 11, and 12, the interior wall of this overflow-lip is substantially vertical, and the upper portion thereof is substantially horizontal, and the lip may, if desired, be of this form. I prefer, however, to form the overflow-lip so that it gradually slopes upward and outward with a constantly-increasing flare. This upward flare in cross-section may be either a straight or a curved line, the latter form being illustrated in Fig. 10.

Figure 5:
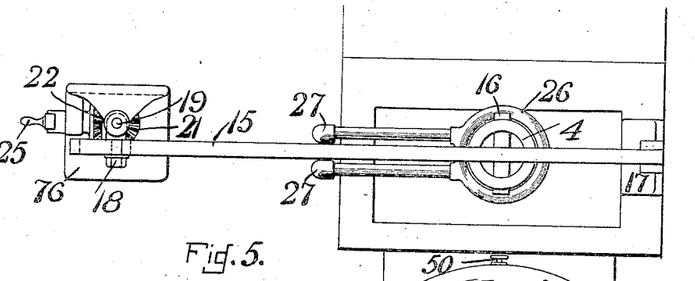
Fig. 5 is a plan view of the apparatus, the upper portion thereof being shown in horizontal section.

As long as the melting and refining chamber 1, the pressure or delivery chamber 2, and the receiving chamber or pot 5 are in open communication through conduits 3 and 6 the level of the molten glass will be the same in all of the chambers, which level will not be above the margin of the overflow-lip in the receiving-chamber 5. By the present invention, however, means are provided whereby the level of the glass in the receiving-chamber 5 may be raised so as to cause it to flow over the overflow-lip 14. Any suitable device for accomplishing this end may be employed. One convenient device consists of the displacement-piece 4. This consists of a block, preferably hollow and constructed of any suitable material for resisting the heat of the molten glass, so positioned as to be capable of being forced down into the mass of the molten glass within the pressure or delivery chamber 2, and thereby raising the surface of the glass by reason of the displacement due to the block 4. In order that this should be effective, it is essential that the communication between the melting or refining chamber 1 and the delivery or pressure chamber 2 should be closed. This may be accomplished by causing the block 4 as it is depressed into the body of the molten glass to close the conduit 3, connecting the chambers 1 and 2. For the purpose of raising and lowering the displacing-block 4 said block is connected to a lever 15 by a pin 16, said lever being fulcrumed at one end in a bracket 17, (see Figs. 3 and 5,) mounted on the walls of the apparatus, the other end of the lever being provided with a slot through which is passed a wrist-pin 18, supported by a nut on the vertical screw 19, mounted to turn in bearings 20 20 on the supporting-frame 76 of the structure. Fast on the lower end of the screw 19 is a beveled gear 21, meshing with beveled gear 22 on a shaft 23, turning in suitable bearings 24 and provided with crank 25 for operating the same. It will be apparent that by rotating the crank 25 the lever 15 will be elevated or lowered at will, thereby elevating or depressing the displacement-block 4. For the purpose of protecting the inlet through which the displacement-block passes and to keep the upper portion cool a water-pipe 26 surrounds the displacement-block 4 and is provided with inlet and outlet pipes 27 (see Fig. 5) for the purpose of affording a circulation of water therethrough.

Figure 3:
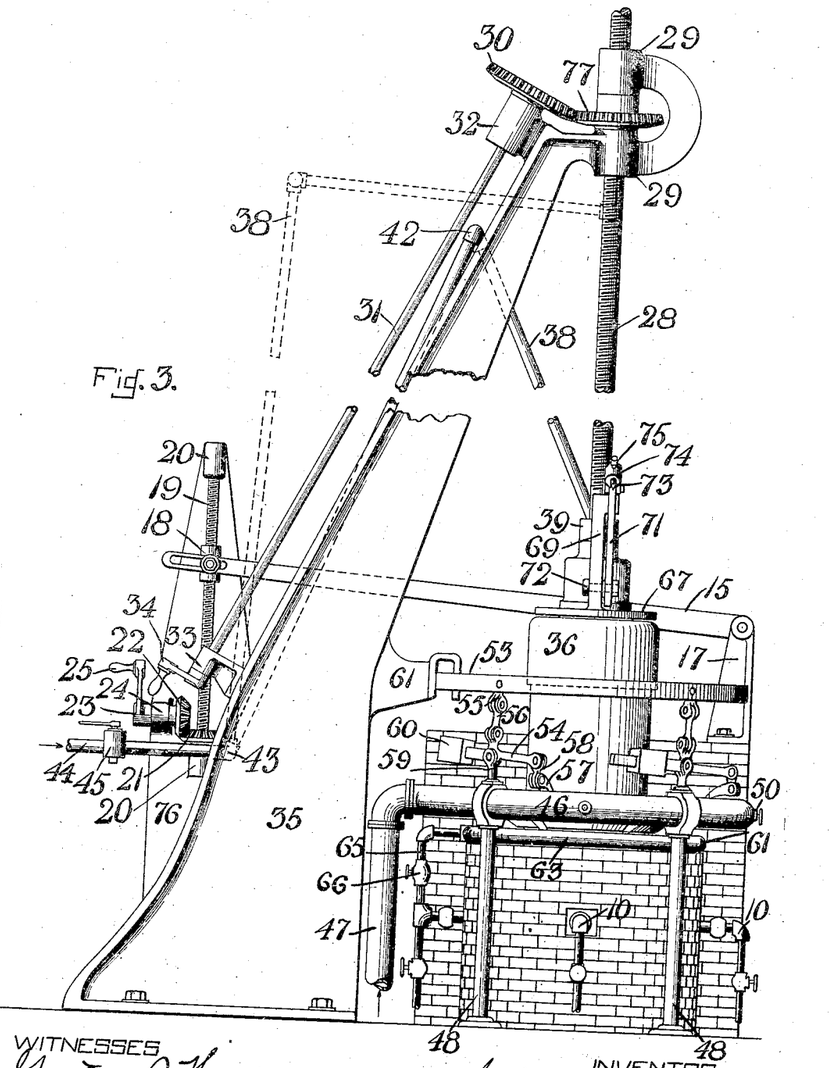
Fig. 3 is a side elevation of the apparatus.

The apparatus for drawing the cylinder of glass is best shown in Figs. 1, 2, and 3, and consists of a vertical screw 28, sliding in bearings 29 29, formed on the upper portion of the main frame 35, between which is a nut meshing with the screw and provided with a bevel-gear which meshes with a similar bevel-gear 30, fast on the inclined shaft 31, turning in bearings 32 33 on the main frame 35, said shaft being actuated by the crank 34 at the lower end thereof, all as very clearly shown in Fig. 3. The screw-shaft 28 may be restrained from turning in its bearings in any suitable manner, as by a key 28', Fig. 1, formed in one of the bearings 29 and engaging a longitudinal groove or way in the screw, as will be well understood.

Secured to the lower end of the screw 28 in any suitable manner, as by collar and set-screw or otherwise, is the bait 36, which may be of any desired form in horizontal section, here shown in all of the figures as being circular, though in drawing the form shown in Figs. 12 and 13 the bait would be composed of two flat parallel sides connected at their ends by curved or oval portions. The form of the tube of glass drawn will depend upon the form of the bait, all of which forms are intended to be included in the term "cylinder" as used herein.

Referring to Fig. 1, 37 is an inwardly-opening clack-valve controlling an air-port in the wall of the bait, and 38 is an air-conducting pipe leading into the upper portion of the bait 36, and preferably so as to discharge upon the inner surface of the clack-valve 37. If the cylinder of glass is being drawn without the aid of air-pressure, the clack-valve will open and admit air from the external atmosphere; but in treating the cylinder by the use of internal air-pressure the clack-valve 37 will close and be held so by the pressure of air within the cylinder received from the air-supply pipe 38. This pipe is held or supported upon the screw 28 by a collar 39 and connecting-piece 40, the pipe being provided with suitable swivel-joints 41, 42, and 43, (see Figs. 1 and 3,) which enable the pipe to have the flexibility requisite to enable its delivery end to travel with the bait 36, as will be well understood from an inspection of Fig. 3. The lower end of the pipe is made fast to or supported upon the frame 35 and receives its air-supply through supply-pipe 44, leading from a source of compressed air, which is controlled by a valve 45, whereby the pressure of air let into the glass cylinder is regulated. This valve may be of any suitable construction, preferably, however, of the construction shown in my application for United States Letters Patent, Serial No. 145,879.

Any suitable apparatus may be employed for chilling the exterior surface of the cylinder of glass as it is being drawn, one form of practical apparatus being herein illustrated, the same being substantially of the character shown in German patent to Oppermann, No. 36,214, and consists, essentially, of a circular conduit 46 surrounding the cylinder being drawn and supplied with compressed air from any suitable source through conduit 47, Fig. 3. This air-supply-conduit is supported in any suitable manner in position around the cylinder, as by columns or supports 48 48, and is provided with a plurality of tubulares 49, Fig. 1, each of which is controlled by a suitable valve 50. The air flowing from these tubulares strikes the under surface of an inverted cone 51, constructed of any suitable light material, preferably sheet-iron. The position of the cone 51 is such that the air is thereby directed against the desired point upon the exterior surface of the cylinder for chilling the same immediately after the cylinder has been drawn from the lip of the receiving chamber or pot. The under side of the cone 51 is provided with radial vanes 52 for directing the currents of air. The vertical position of the cone is capable of adjustment. This may be accomplished in any suitable manner, and as here shown is secured by connecting the cone through radial arms 57 to a series of levers 54, mounted on suitable fulcrums 59, carried in this instance by the columns 48, supporting the air-conduit 46. These levers are provided with counterbalances 60, whereby the weight of the cone 51 is equalized, and the raising or lowering of the cone is effected by the simultaneous rocking of the several levers 54 upon their fulcrums. This is accomplished by connecting all of said levers by means of links 55 and 56 to a hoop 53, supported in brackets 61 and 62, as shown in Figs. 1 and 3. By throwing the hoop 53 in either direction the levers 54 will be caused to rock in the same direction and elevate or depress the cone 51, as the case may be.

Figure 4:
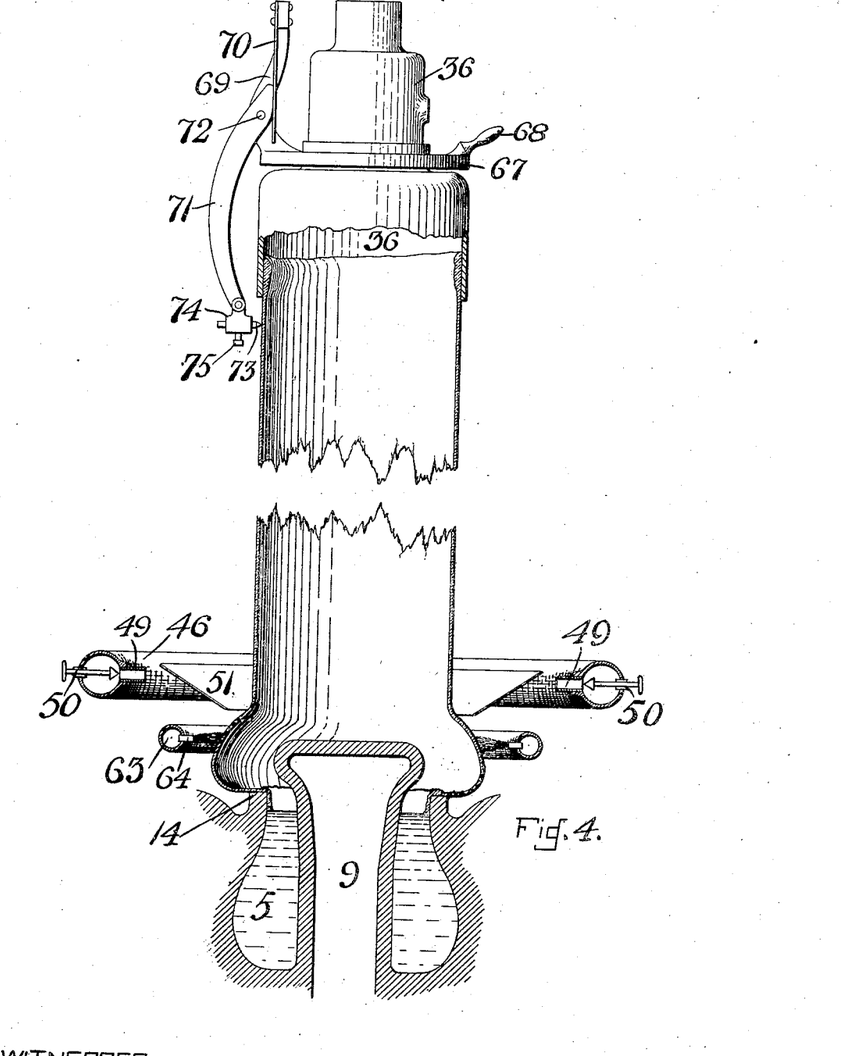
Fig. 4 is a vertical broken section of a detail.

For the purpose of detaching the finished cylinder of glass from the overflow-lip 14 I have supplied means whereby sufficient heat to melt the glass immediately above the lip is supplied. This is illustrated in Figs. 1 and 4, wherein 63 is an annular gas-pipe provided with burners or jets 64, extending radially inward toward the cylinder, gas being furnished to pipe 63 by supply-pipe 65, controlled by valve 66, as shown in Fig. 3.

Any suitable means may be employed for severing the glass cylinder from the bait 36. As here shown it consists, essentially, of the apparatus shown in German patent to Oppermann before mentioned and comprises an annular disk 67, rotatable around the upper reduced portion of the bait 36, (see Fig. 1,) provided with a handle 68 for revolving the disk, and a bracket 69, provided with a spring 70, bearing upon the short arm of a lever 71, pivoted to the bracket at 72 and carrying a cutting-point 73, mounted on the exterior end of the lever 71 by means of a collar 74 and set-screw 75. The construction of the short or tail end of the lever 71 is such that the spring 70 acts either to hold the lever elevated, as shown in Fig. 1, or depressed in the position shown in Fig. 4. During the act of drawing the cylinder the lever occupies the position shown in Fig. 1; but when the cylinder has been separated from the mass of molten glass at its lower end the lever 71 is depressed from the position shown in Fig. 1 to the position shown in Fig. 4 and the disk 67 rotated by means of the handle 78, whereupon the glass is scratched or cut so as to provide a line of fracture in a way that is well understood in this art.

Figure 6:
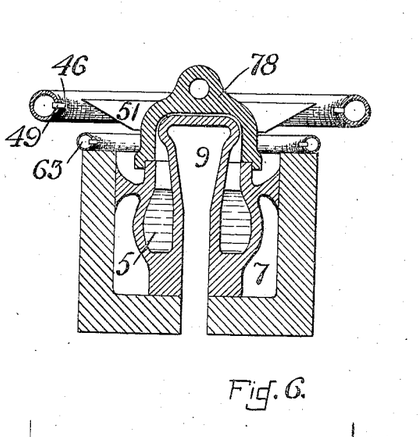
Fig. 6 is a central vertical section of the receiving chamber or pot, and the filling-block, cover, exterior cooling apparatus, and other details.

Prior to the drawing of a cylinder and between the operations of drawing cylinders it may be found desirable to cover the mouth of the receiving chamber or pot 5, and this may be accomplished by any suitable covering device—such, for example, as the cover 78, illustrated in Fig. 6—provided with a suitable eye or other means for enabling it to be placed in position and removed by a crane or other suitable device.

Operation: Assuming the displacement-piece 4 to be elevated out of the molten glass, the glass in the melting or refining chamber 1, the delivering-chamber 2, and the receiving chamber or pot 5 will all be on the same level by reason of the communicating conduits between the several chambers. The molten glass in the receiving chamber or pot having been brought to the proper condition of refinement and temperature and water or other suitable cooling medium being circulated through the cooling-pipe 26, surrounding the displacement-block, and also through the filling-block cooler and the air in the filling-block turned on and the air used for expanding the glass-cylinder cut off, the apparatus is in condition to commence operation. The gas-jet 64 should be lighted, but turned very low, so as to produce but little heat. The condition of the glass will determine the position of the cone 51 and also whether or not air should be issuing from the tubulares 49 of the cooling-tube 46. All the parts being in readiness, the bait is lowered to its lowest position and surrounds the overflow-lip 14, as shown in Fig. 2, the cutting-point 73, carried by the bait, being elevated into the position shown in Fig. 1. The bait having been previously prepared so that the molten glass will adhere to it, the displacement-block 4 is lowered into the molten glass, thereby closing the conduit 3 between chambers 1 and 2 and raising the surface of the glass in chambers 2 and 5 so as to cause the same to overflow the margin or lip 14 of the receiving chamber or pot and be caught by the bait, to which it will soon adhere firmly enough to permit the bait to be elevated through the medium of the screw 28 and its operating-shaft and gearing. Simultaneously with the starting of the bait upward compressed air is admitted into the cylinder at the desired pressure, which is regulated through the valve 45 so as to keep the cylinder expanded to the desired diameter. As the bait travels upward and the air is admitted into the cylinder, the overflow of molten glass at the lip 14 is maintained by the continued depression of the displacement-block 4 through the medium of the lever 15 and the operating mechanism therefor. This overflow can be kept constant or be varied at will, as it is under the complete control of the operator at all times. If the glass appears to be pulling too thin, the air-blast can be directed on it from the circular conduit tubulares 49 and this blast of air directed to the proper level by adjusting the cone 51. Should the glass be pulling thinner on one side than on the other, the air-blast can be directed to the side where the glass is pulling too thin by closing the tubulares where the glass is thickest and opening those on the side where the glass is pulling too thin by operating valves 50 controlling the tubulares 49. By this means the air-blast can be directed to any desired place at the base of the cylinder and to any desired portion or side of the cylinder by simply adjusting the cone 51 and controlling the valves 50. When the cylinder has been drawn to the desired length, the overflow of molten glass may be caused to cease and permitted to drop back into the receiving chamber or pot 5 by withdrawing the displacement-block 4 from the delivering-chamber 2 by operating the crank and lever controlling said block. This being done, the cylinder is severed at its lowermost end by increasing the flame from the jets 64 in the coil 63 to a point sufficient to melt the lower part of the cylinder. This being done, the upward speed of the bait is increased as well as the internal air-pressure, and since there is no molten glass to pull from the lower end the cylinder will quickly be drawn out quite thin, and being heated to a melting condition by the jets 64, the increased pressure in the cylinder will blow out at this thin melted portion, as shown in Fig. 4, thereby severing the cylinder from the body of the glass and leaving the surface of the molten glass in the receiving chamber or pot free from all pieces of broken glass which would interfere with the beginning of the operation for the next cylinder. After the cylinder has been thus severed at the lower end the air entering through pipe 38 is cut off and the bait is raised high enough so that the bottom portion of the cylinder will clear the hoop 53, when it may be deposited on any suitable support upon which it may be raised in order to be carried away from the machine. This having been accomplished, the arm 71 is lowered so as to bring the cutting-point 73 in contact with the surface of the cylinder, against which it is held by the spring 70, and the operator by grasping the handle 68 revolves the disk 67, and with it the point 73, around the cylinder, thereby forming a scratch which will control the line of fracture when the cylinder is tapped and it is caused to crack away from the bait. During intervals between drawing operations it may be necessary to heat the glass in the receiving-chamber to get it into proper condition for first-class work. This is accomplished by placing the cover 78 over the receiving-chamber, as shown in Fig. 6, thus preventing the heat from passing out of the top of the receiving-chamber. As heretofore explained, it is not at all essential that the bait should be circular in cross-section, as any desired form in cross-section may be employed—as, for example, that shown in Fig. 12. Moreover, it is not necessary to draw the cylinder of the size or diameter of the bait, for one may be drawn larger than the bait by using a higher air-pressure to begin with and keeping the cylinder expanded to the desired diameter thereafter, as is illustrated in Fig. 11.

It is believed to be new to draw glass from the overflow of the pot, chamber, or receptacle of molten glass, as well as to draw the glass from a chamber, receptacle, or pot wherein the glass is maintained at a constant level even where the same is not raised to a sufficient height to cause it to overflow. This latter phase of the invention is illustrated in Fig. 10, wherein the level of the glass is constantly below the lip or margin of the receiving chamber or pot, but is maintained at a constant level through the agency of the displacement-block 4, as shown in Fig. 1, thereby insuring that the cooling devices will continuously act upon the body of the glass at a predetermined distance above the point where it is withdrawn from the receiving chamber or pot. This practically guarantees constant conditions and enables a product of uniform quality and thickness to be produced with great facility. In this case it is also quite possible to expand the cylinder to a diameter considerably exceeding that at the forming-point. The method of treating cylinders as disclosed in the present application enables the molten glass to be kept at a uniform heat as it is supplied from the delivering-chamber, and all portions of it are subjected to the same conditions, whereas if the cylinder was drawn from a pot, ladle, or trough which was not provided with means for maintaining a constant level of the molten glass as the same is worked the conditions would vary so widely that the product would have little, if any, commercial value.

What is claimed is—

1. In a glass-drawing apparatus, the combination of a receiving chamber or pot for holding the bath of molten glass, with means for drawing the glass, and means maintaining the molten glass at an approximately constant level in said receiving chamber or pot as the glass is being drawn.

2. In a glass-drawing apparatus, the combination of a receiving chamber or pot for holding the bath of molten glass, with means for maintaining an overflow of the glass at the lip or upper margin of the receiving chamber or pot, and means for drawing the glass as it flows from said lip or margin.

3. In a glass-drawing apparatus, the combination of a glass melting or refining chamber, a receiving chamber or pot, means leading the molten glass from the refining-chamber to the receiving-chamber, means for drawing the glass from the receiving-chamber, and means maintaining the molten glass at an approximately constant level in the receiving-chamber as the same is being drawn.

4. In a glass-drawing apparatus, the combination of a receiving chamber or pot for holding the bath of molten glass, and means for drawing the glass, with means for maintaining the glass at an approximately constant level in said receiving chamber or pot as the glass is being drawn, and a cooling device or devices located a predetermined distance above the surface of the molten glass.

5. In a glass-drawing apparatus, the combination of a receiving chamber or pot for holding the bath of molten glass, and means for drawing the glass, with means for maintaining the molten glass at an approximately constant level in said receiving chamber or pot as the glass is being drawn, and glass-cooling means adjacent to the opposite surfaces of the drawn glass.

6. In a glass-drawing apparatus, the combination of a receiving chamber or pot for holding the bath of molten glass, and means for drawing the glass, with a displacement element for controlling the level of the molten glass in said receiving chamber or pot.

7. In a glass-drawing apparatus, the combination of a receiving chamber or pot for holding the bath of molten glass, and means for drawing the glass, with a displacement element for controlling the level of the molten glass in said receiving chamber or pot, and means for operating said element.

8. In a glass-drawing apparatus, the combination of a melting or refining chamber, a receiving-chamber, a delivery-chamber interposed between the melting and receiving-chambers, and conduits connecting said chambers in series, with means for drawing the glass from the receiving-chamber, and displacement means in the delivery-chamber whereby the level of the glass in the receiving-chamber is controlled.

9. In a glass-drawing apparatus, the combination of a receiving chamber or pot, an overflow lip or edge on said pot, means causing the glass to flow over said lip, a bait drawing the overflow-glass from said lip, and means simultaneously cooling both surfaces of the glass as drawn.

10. In a glass-drawing apparatus, the combination of a stationary receiving chamber or pot to contain the molten glass to be drawn, means for drawing a cylinder from said pot, a heating device surrounding the base of the cylinder, and means leading air under pressure within said cylinder, whereby the base of the cylinder may be softened and separated from the pot.

11. In a glass-drawing apparatus, the combination of a receiving chamber or pot for holding the bath of molten glass, with means for drawing a cylinder of glass from said pot, and means maintaining the molten glass at an approximately constant level in said receiving chamber or pot as the cylinder is being drawn.

12. In a glass-drawing apparatus, the combination of a receiving chamber or pot for holding the bath of molten glass, with means for maintaining an overflow of the glass at the lip or upper margin of the receiving chamber or pot, and means for drawing a cylinder of glass as it flows from said lip or margin.

13. In a glass-drawing apparatus, the combination of a glass melting or refining chamber, a receiving chamber or pot, means leading the molten glass from the refining-chamber to the receiving-chamber, means for drawing a cylinder of glass from said receiving-chamber, and means maintaining the molten glass at an approximately constant level in the receiving-chamber as the same is being drawn.

14. In a glass-drawing apparatus, the combination of a receiving chamber or pot for holding the bath of molten glass, and means for drawing a cylinder of glass therefrom, with means for maintaining the molten glass at an approximately constant level in said receiving chamber or pot as the cylinder is being drawn, and a cooling device or devices located a predetermined distance above the surface of the molten glass.

15. In a glass-drawing apparatus, the combination of a receiving chamber or pot for holding the bath of molten glass, means for drawing a cylinder of glass from said pot, means for maintaining the molten glass at an approximately constant level in said receiving chamber or pot as the cylinder is being drawn, and glass-cooling means adjacent to the exterior and interior surfaces of said cylinder.

16. In a glass-drawing apparatus, the combination of a receiving chamber or pot, an overflow lip or edge on said pot, means constantly maintaining the molten glass at the top of said lip or edge, a cylindrical bait receiving the glass at said lip or edge, whereby a cylinder of glass is drawn, and means simultaneously cooling both surfaces of the cylinder as drawn.

17. The improvement in the art of glass working which consists in causing a portion of molten glass to continuously overflow from the container therefor, continuously drawing said overflow portion as it overflows and continuously cooling the glass as drawn.

18. The improvement in the art of glass working which consists in causing a portion of the molten glass to continuously overflow from the container therefor, and continuously drawing said overflow portion as it overflows.

19. The improvement in the art of glass working which consists in causing a portion of molten glass to continuously overflow from the container therefor, continuously drawing the said portion as it overflows and continuously cooling the glass as drawn at a point adjacent to its overflow.

20. The improvement in the art of glass working which consists in causing a portion of molten glass to continuously overflow from the container therefor, continuously drawing the said portion as it overflows and simultaneously cooling the glass on both sides as drawn.

21. The improvement in the art of glass working which consists in causing a portion of molten glass to continuously overflow from the container therefor, continuously drawing the said portion as it overflows and simultaneously cooling the glass on both sides as drawn at a point adjacent to the overflow.

22. The improvement in the art of glass working which consists in drawing a cylinder of glass from a molten mass of glass, heating the base of the cylinder till it is softened and then separating the cylinder from the molten mass by air-pressure introduced within the cylinder.

23. The improvement in the art of glass working which consists in causing a portion of molten glass to continuously overflow from the container therefor, drawing the said portion in cylindrical form as it overflows, and subjecting the cylinder to internal gas-pressure during the drawing operation.

24. The improvement in the art of glass working which consists in causing molten glass to continuously overflow from the container therefor, drawing the overflow-glass into tubular form and simultaneously cooling the tube on the exterior and interior as the drawing proceeds.

In testimony whereof I have signed this specification in the presence of two subscribing witnesses.

IRVING W. COLBURN.

Witnesses:
  THOMAS MCGOUGH,
  JOHN BURGARD.